US011618001B2

(12) United States Patent
Herlin et al.

(10) Patent No.: US 11,618,001 B2
(45) Date of Patent: Apr. 4, 2023

(54) DEVICE FOR SYNTHESISING CORE/SHELL TYPE NANOPARTICLES BY LASER PYROLYSIS AND ASSOCIATED METHOD

(71) Applicant: COMMISSARIAT A L'ENERGIE ATOMIQUE ET AUX ENERGIES ALTERNATIVES, Paris (FR)

(72) Inventors: Nathalie Herlin, Orsay (FR); Florent Boismain, Orsay (FR); John Alper, Grenoble (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 799 days.

(21) Appl. No.: 16/463,907

(22) PCT Filed: Nov. 30, 2017

(86) PCT No.: PCT/EP2017/081044
§ 371 (c)(1),
(2) Date: Aug. 19, 2019

(87) PCT Pub. No.: WO2018/100094
PCT Pub. Date: Jun. 7, 2018

(65) Prior Publication Data
US 2019/0388865 A1      Dec. 26, 2019

(30) Foreign Application Priority Data

Nov. 30, 2016   (FR) ........................................ 1661759

(51) Int. Cl.
*B01J 19/12*   (2006.01)
*B01J 13/02*   (2006.01)
(Continued)

(52) U.S. Cl.
CPC ............. *B01J 19/121* (2013.01); *B01J 13/02* (2013.01); *B22F 1/17* (2022.01); *B22F 9/30* (2013.01);
(Continued)

(58) Field of Classification Search
CPC ..................... B01J 19/121; B01J 13/02; B01J 2219/00033; B22F 1/17; B22F 9/30;
(Continued)

(56) References Cited

U.S. PATENT DOCUMENTS

2006/0137487 A1* 6/2006 McKinnon .............. H01M 4/92
75/363
2009/0026421 A1* 1/2009 Li ........................... B82Y 20/00
118/716

(Continued)

FOREIGN PATENT DOCUMENTS

FR         2 998 485 A1    5/2014
WO    WO 2010/005035 A1   1/2010

OTHER PUBLICATIONS

International Search Report and Written Opinion for Application No. PCT/EP2017/081044 dated Feb. 14, 2018, 12 pages.
(Continued)

*Primary Examiner* — Nicholas A Smith
(74) *Attorney, Agent, or Firm* — Alston & Bird LLP

(57) ABSTRACT

A device for synthesising core-shell nanoparticles by laser pyrolysis is provided. The device includes a reactor having a first chamber for the synthesis of the core, provided with an inlet for a core precursor, a second chamber for the synthesis of the shell, provided with an inlet for a shell precursor, and at least one communication channel between the two chambers to transmit the cores of the nanoparticles intended to be formed from the first chamber towards the second chamber. The device also includes an optical device
(Continued)

to illuminate each of the two chambers, the device comprising at least one laser capable of emitting a laser beam intended to interact with the precursors to form the core and the shell. The device further includes at least a shell precursor inlet channel, one end of which is in the form of a distribution chamber surrounding the communication channel between the two chambers of the reactor, said distribution chamber being further provided, on its inner periphery, with at least one opening leading inside said communication channel.

21 Claims, 12 Drawing Sheets

(51) Int. Cl.
*C01B 32/05* (2017.01)
*B22F 9/30* (2006.01)
*B22F 1/17* (2022.01)

(52) U.S. Cl.
CPC ..... *C01B 32/05* (2017.08); *B01J 2219/00033* (2013.01); *C01P 2004/32* (2013.01); *C01P 2004/84* (2013.01)

(58) Field of Classification Search
CPC ...... B22F 1/054; C01B 32/05; C01P 2004/32; C01P 2004/84
See application file for complete search history.

(56) References Cited

U.S. PATENT DOCUMENTS

2010/0147675 A1* 6/2010 Herlin-Boime ....... C01B 33/021
422/186
2015/0299861 A1 10/2015 Leconte et al.

OTHER PUBLICATIONS

Melinon, P. et al., *Engineered Inorganic Core/Shell Nanoparticles*, Physics Reports, vol. 543, No. 3 (Jun. 14, 2014) 163-197.

* cited by examiner (cut view A-A)

(cut view B-B)

(cut view A-A)

(cut view B-B)

(cut view A-A)

(cut view B-B)

(cut view A-A)

(cut view B-B)

(cut view A-A)

(cut view B-B)

DEVICE FOR SYNTHESISING CORE/SHELL TYPE NANOPARTICLES BY LASER PYROLYSIS AND ASSOCIATED METHOD

CROSS-REFERENCE TO RELATED APPLICATIONS

The present application is a national phase entry of PCT/EP2017/081044, filed on Nov. 30, 2017, which claims the benefit of, and priority to, French Patent Application No. 1661759, filed on Nov. 30, 2016, the entire contents of which are incorporated herein by reference in their entirety for all purposes.

TECHNICAL FIELD

The present invention relates to a device for synthesising core-shell nanoparticles by laser pyrolysis.

BACKGROUND

The term "nanoparticle" is used to describe particles with dimensions that are less than a micron.

Core-shell nanoparticles are formed from a core coated with a shell. This coating can be total or partial, as is shown in the various diagrams a, b, c and d of FIG. 1. In these diagrams, the core is referenced 150 and the shell is referenced 160.

Laser pyrolysis is largely used to synthesise core-shell particles.

An example of such a device is disclosed in document FR 2 998 485 (D1).

More specifically, document D1 proposes a device for synthesising core-shell nanoparticles by laser pyrolysis, comprising:
a reactor comprising:
  a first chamber for the synthesis of the core, provided with an inlet for a core precursor;
  a second chamber for the synthesis of the shell, provided with an inlet for a shell precursor;
  at least one communication channel between the two chambers, to transmit the core of the nanoparticles intended to be formed from the first chamber to the second chamber;
an optical device to illuminate each of both chambers, the device comprising at least one laser capable of emitting a laser beam intended to interact with the precursors to form the core and the shell.

Thus, core-shell nanoparticles can be synthesised continuously for a broad range of materials forming the core and the shell, regardless of the chemical nature of the materials forming the core and the shell.

This is particularly interesting.

However, once the core of a nanoparticle is formed, it is essential to be able to form a shell around the core. For example, in the embodiment of FIG. 4 of document D1, the configuration of the device implies that the shell precursor arrives, before the zone of interaction with the laser beam, around the core that has already been formed. This does not ensure an optimal mixing of the shell precursor and the nanoparticles that have already been formed and that are intended to form the core of the core-shell nanoparticles.

An objective of the invention is to propose a solution that better ensures the formation of a shell around a core.

BRIEF SUMMARY

To achieve this objective, the invention proposes a device for synthesising core-shell nanoparticles by laser pyrolysis, comprising:
a reactor comprising:
  a first chamber for the synthesis of the core, provided with an inlet for a core precursor;
  a second chamber for the synthesis of the shell, provided with an inlet for a shell precursor; and
  at least one communication channel between the two chambers to transmit the cores of the nanoparticles intended to be formed from the first chamber towards the second chamber;
an optical device to illuminate each of both chambers, the device comprising at least one laser capable of emitting a laser beam intended to interact with the precursors to form the core and the shell;
characterised in that it comprises at least a first shell precursor inlet channel, one end of which is in the form of a distribution chamber surrounding the communication channel between the two chambers of the reactor, said distribution chamber being further provided, on its inner periphery, with at least one opening leading inside said communication channel.

The device according to the invention can also comprise the following characteristics, taken individually or in combination:
- said distribution chamber comprises, on its inner periphery, at least two openings leading inside said communication channel between the two chambers of the reactor;
- said distribution chamber comprises, on its inner periphery, from two to sixteen openings leading inside said communication channel between the two chambers of the reactor;
- the openings of the distribution chamber are evenly distributed around the inner periphery of said distribution chamber;
- the openings of the distribution chamber are identical;
- the greatest dimension of the or of each opening of the distribution chamber ranges from 0.1 mm to 5 mm, preferably from 0.5 mm to 3 mm;
- the optical device comprises a plurality of mirrors arranged so that the laser beam emitted by the laser is capable of illuminating successively the two chambers of the reactor;
- the optical device comprises a beam splitter to adjust the power of the laser beam in each of the two chambers of the reactor, the beam splitter being for example located between two mirrors;
- the optical device comprises a beam splitter and at least one mirror arranged so that the laser beam emitted by the laser is divided into two beams, each capable of illuminating one of the two chambers of the reactor;
- the optical device comprises a first laser to illuminate the first chamber of the reactor and a second laser to illuminate the second chamber of the reactor;
- the optical device comprises at least one focusing means arranged between the or each laser and at least one of the two chambers of the reactor;
- the distance between said at least one focusing means and the adjacent reactor chamber is adjustable;
- the focusing means comprising two cylindrical lenses, the distance between the two cylindrical lenses is adjustable.

The invention also relates to a method for synthesising core-shell nanoparticles by laser pyrolysis, comprising the following steps (a) injecting a core precursor into the first chamber of a reactor;

(b) illuminating the core precursor with a laser beam in order to form, by pyrolysis, the core of the nanoparticles;

(c) transporting the core of the nanoparticles thus formed in step (b) into a second reactor chamber communicating with the first chamber by means of a communication channel between the two chambers;

(d) injecting a shell precursor in the second chamber of the reactor;

(e) illuminating the shell precursor with a laser beam in order to form, by pyrolysis, the shell of the nanoparticles and to ensure the deposition of the shell around the core;

characterised in that step (d) is performed by means of a distribution chamber surrounding said communication channel between the two chambers, said distribution chamber further being provided, on its inner periphery, with at least one opening leading inside said communication channel, so that the average speed of the precursor in said at least one opening ranges from 0.5 m/s to 20 m/s, preferably from 2 m/s to 12 m/s.

The method according to the invention can also comprise at least one of the following characteristics, taken individually or in combination:

said distribution chamber comprises, on its inner periphery, at least two openings leading inside said communication channel between the two chambers of the reactor;

the openings of the distribution chamber are evenly distributed around the inner periphery of said distribution chamber;

the openings of the distribution chamber are identical;

the average speed of the precursor in each opening ranges from 0.5 m/s to 20 m/s, preferably from 2 m/s to 12 m/s.

BRIEF DESCRIPTION OF THE SEVERAL VIEWS OF THE DRAWING(S)

Other characteristics, purposes and advantages of the invention are listed in the detailed description below, with reference to the following figures.

Figure 1:
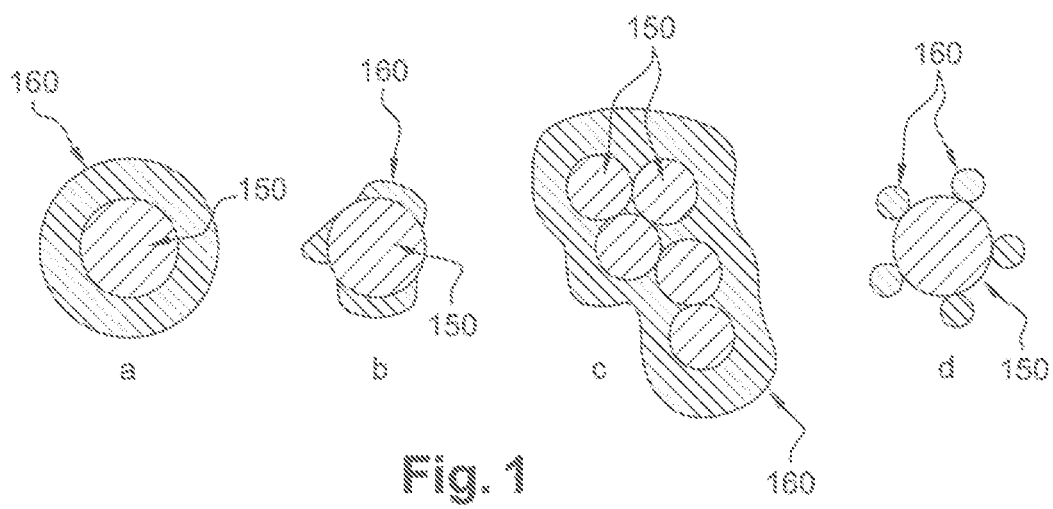
FIG. 1 is a series of diagrams a, b, c, and d showing core-shell nanoparticles according to the prior art.
Figure 2:
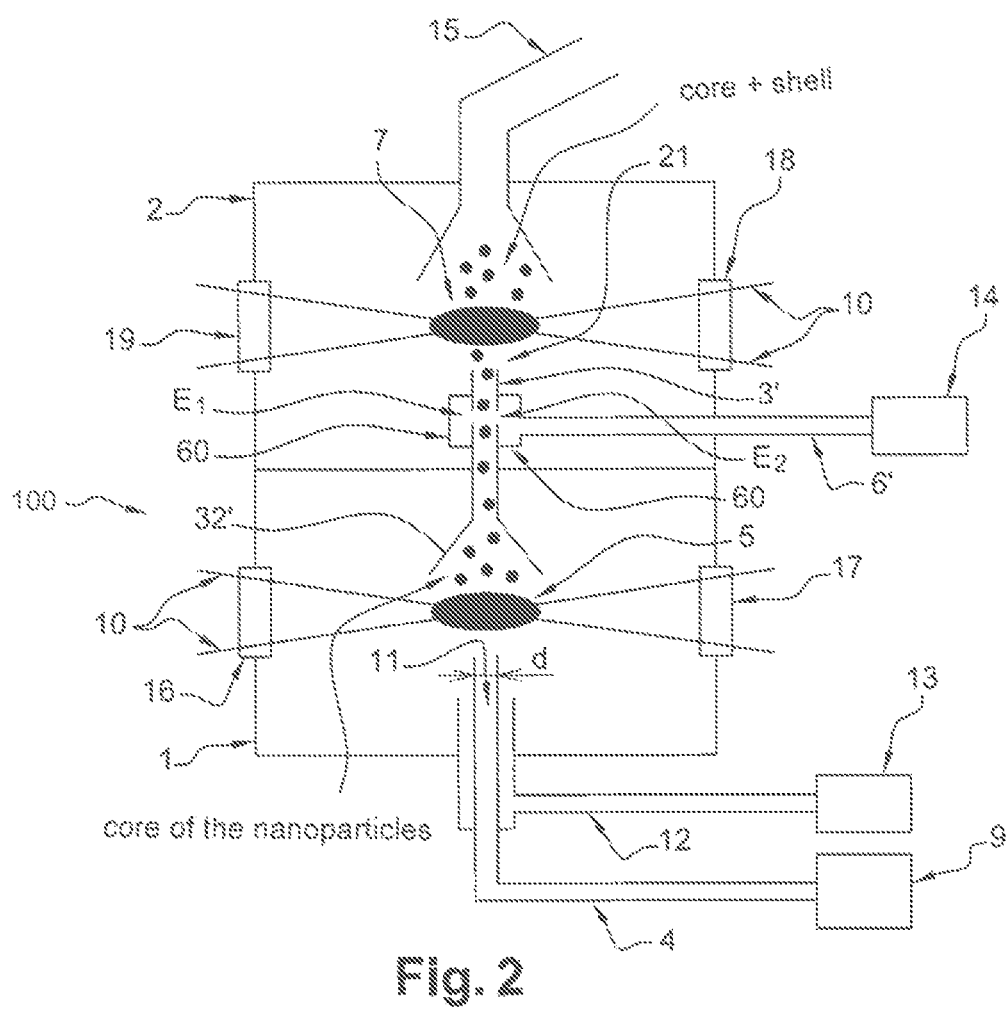
FIG. 2 is a diagram showing a reactor according to the invention.
Figure 4A:
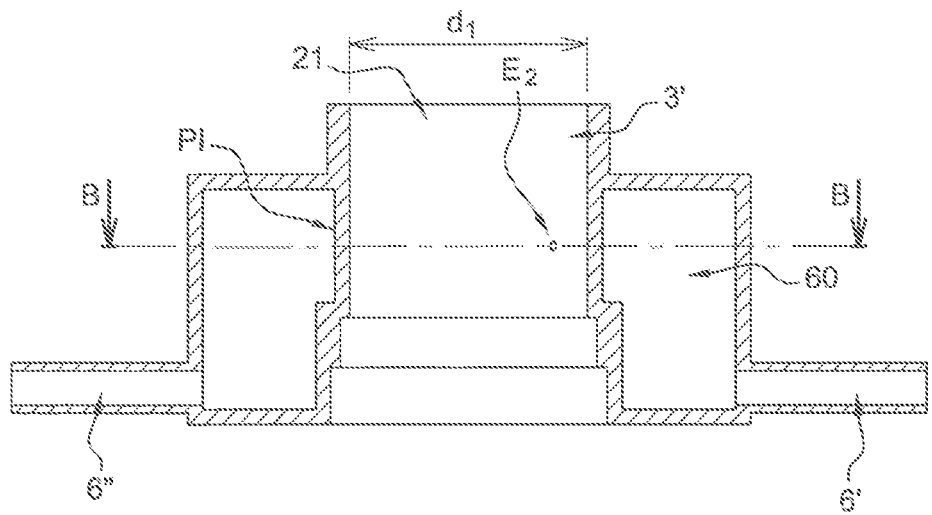
Figure 4B:
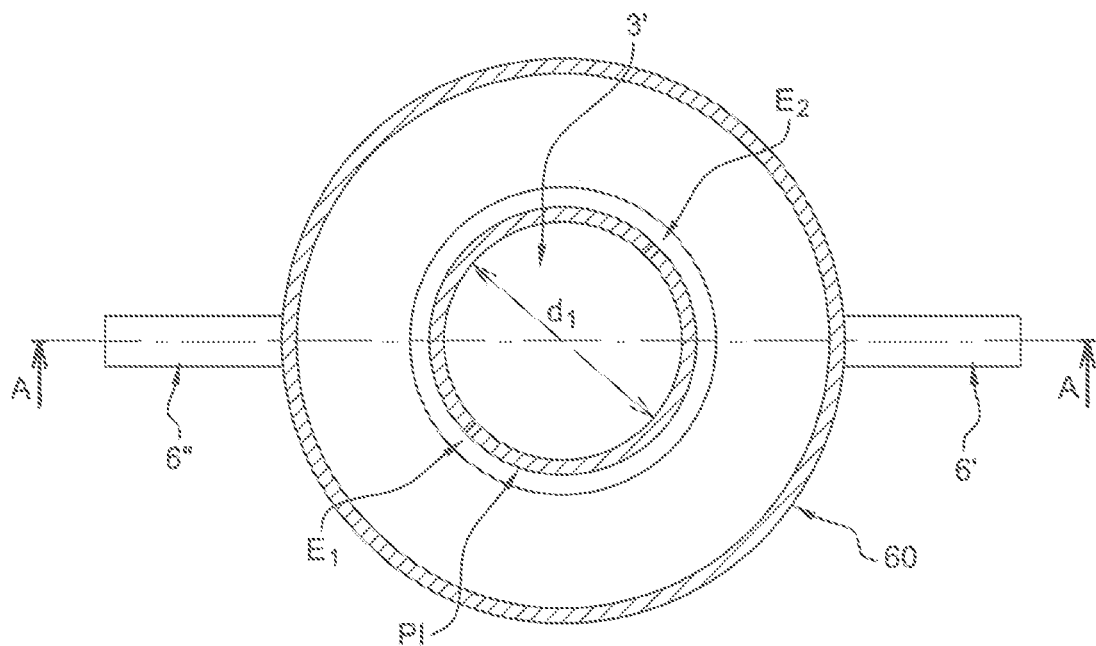
Figure 5A:
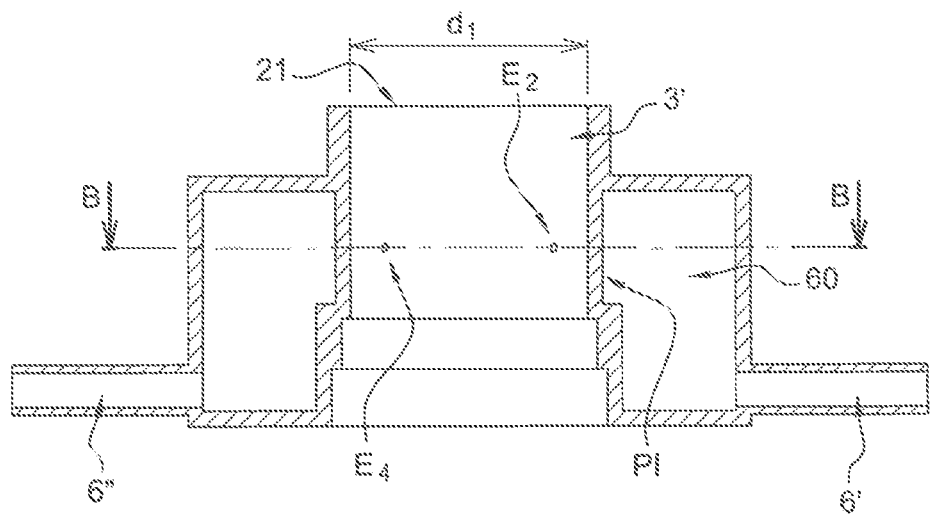
Figure 5B:
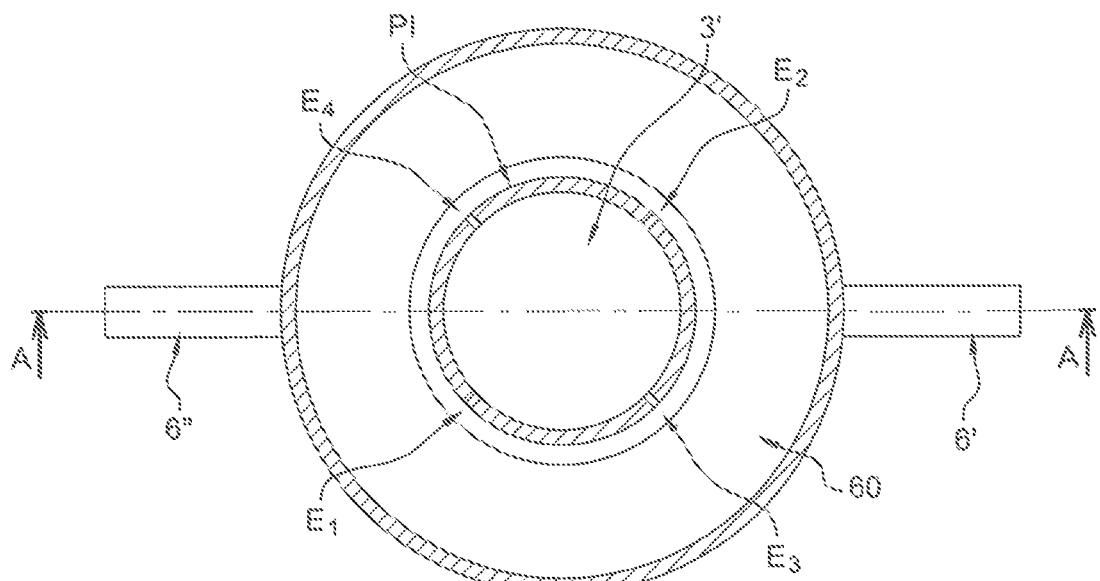
Figure 6A:
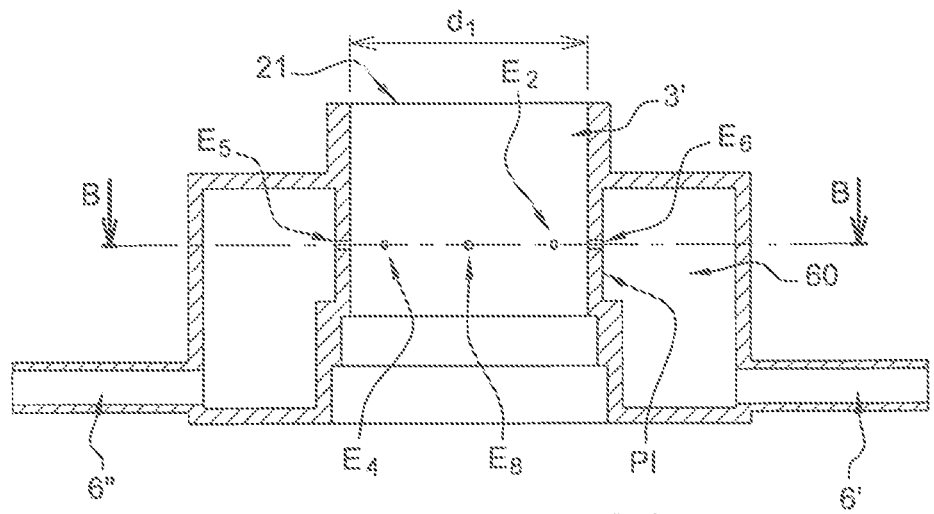
Figure 6B:
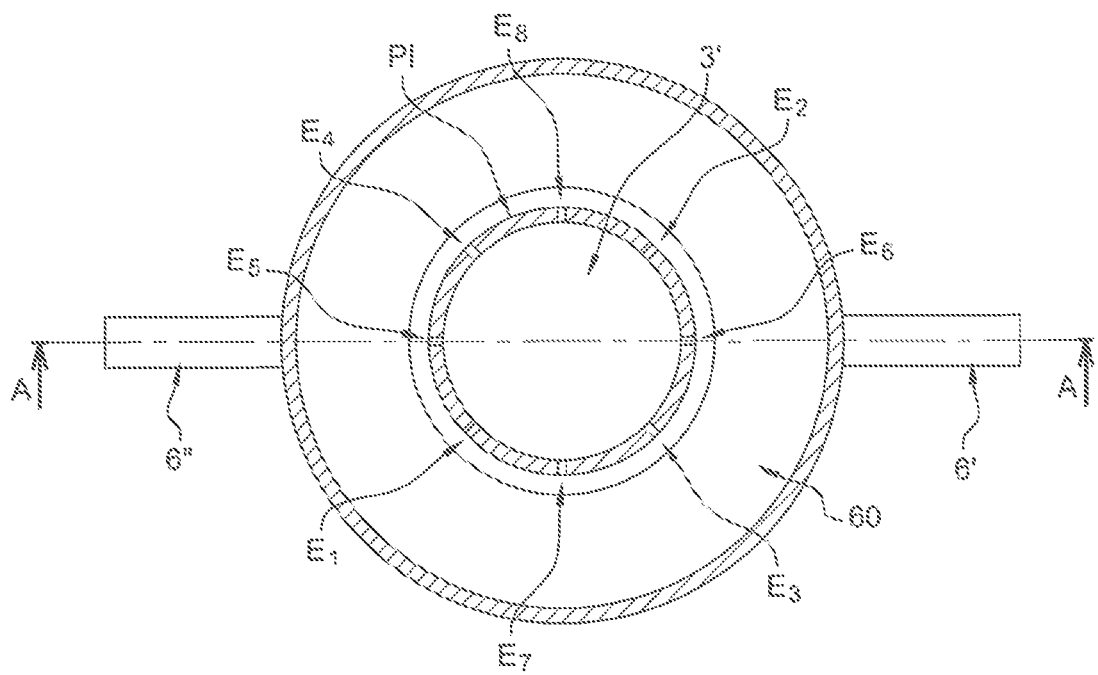
Figure 7A:
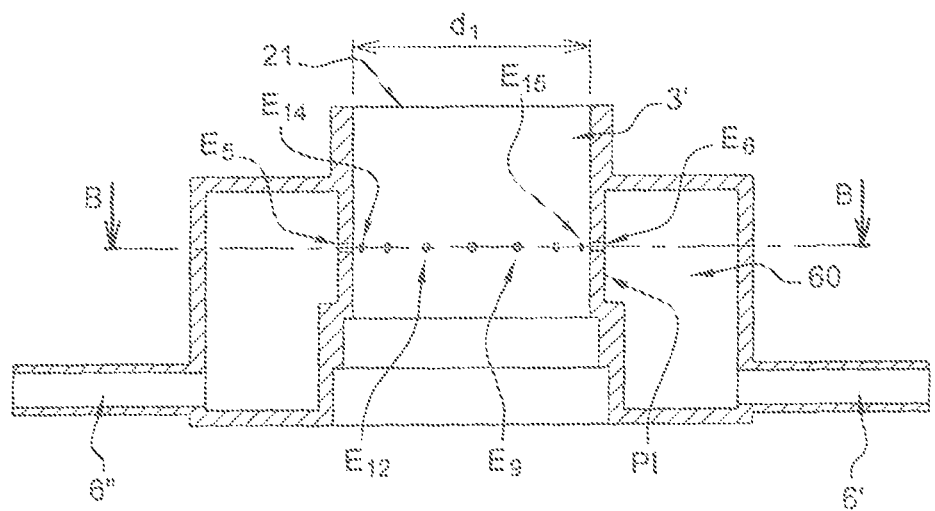
Figure 7B:
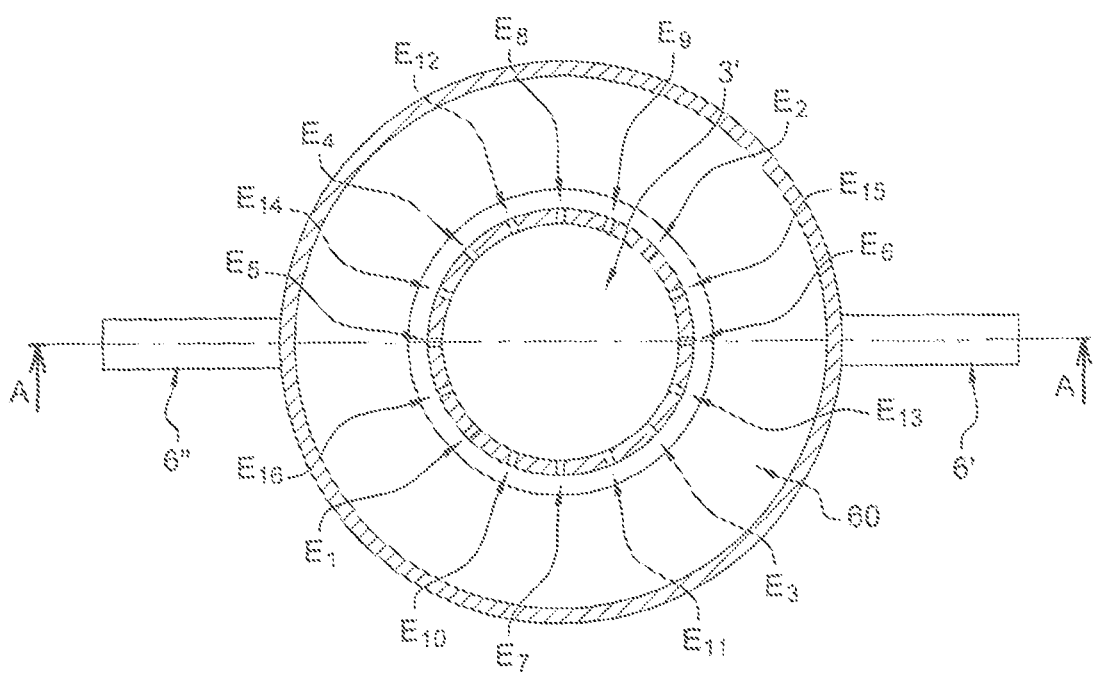
Figure 8:
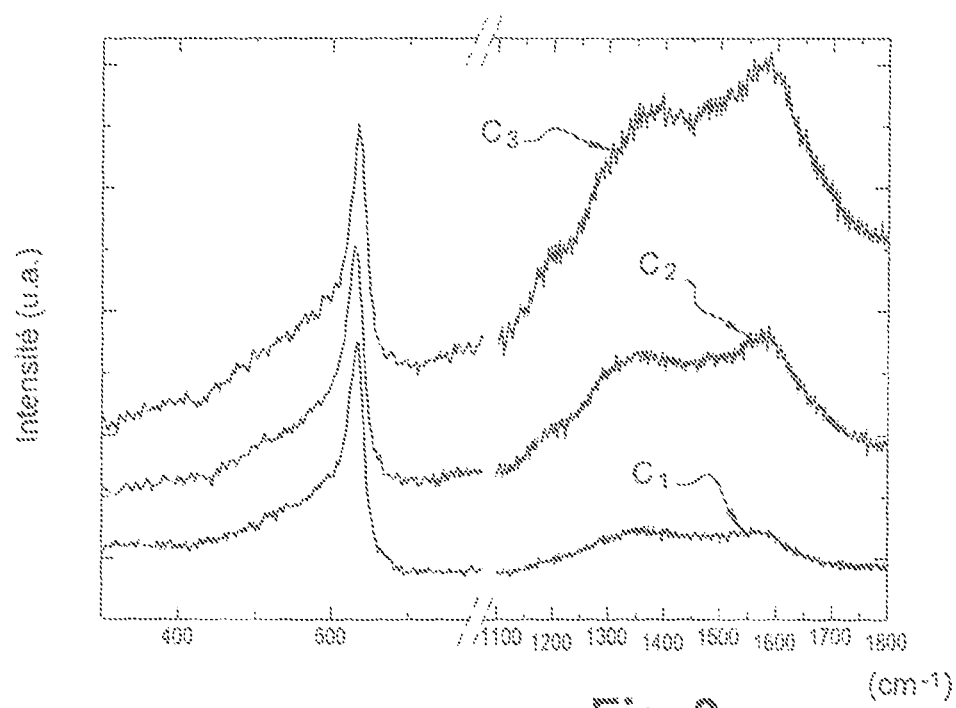
Figure 9B:
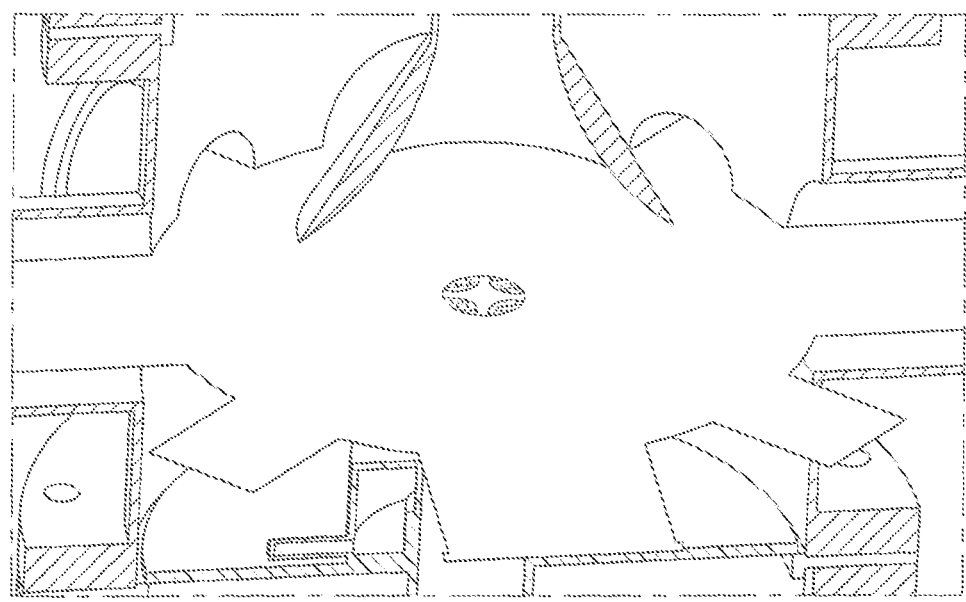
Figure 9A:
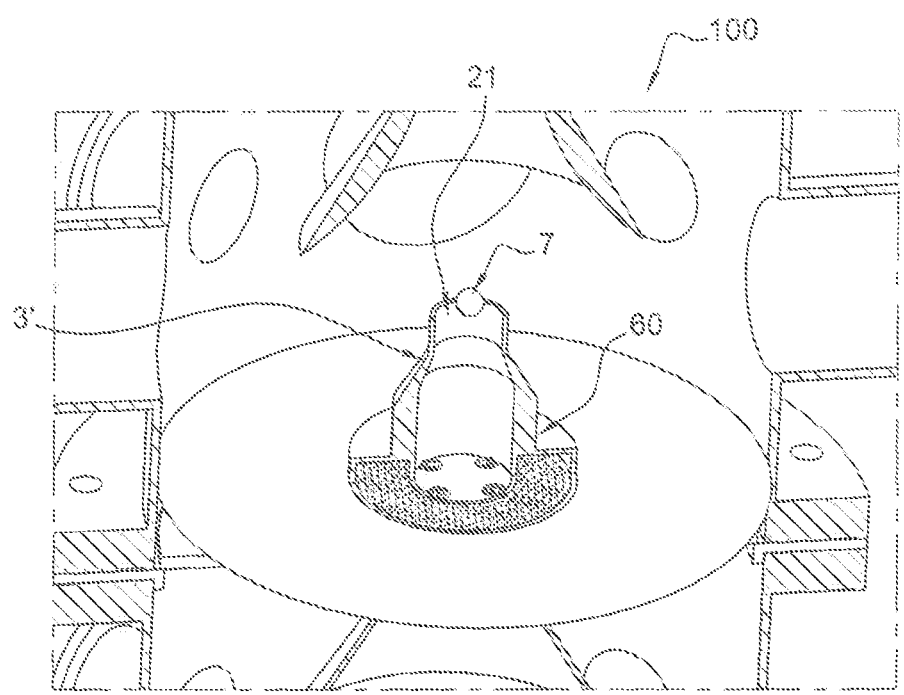
Figure 9C:
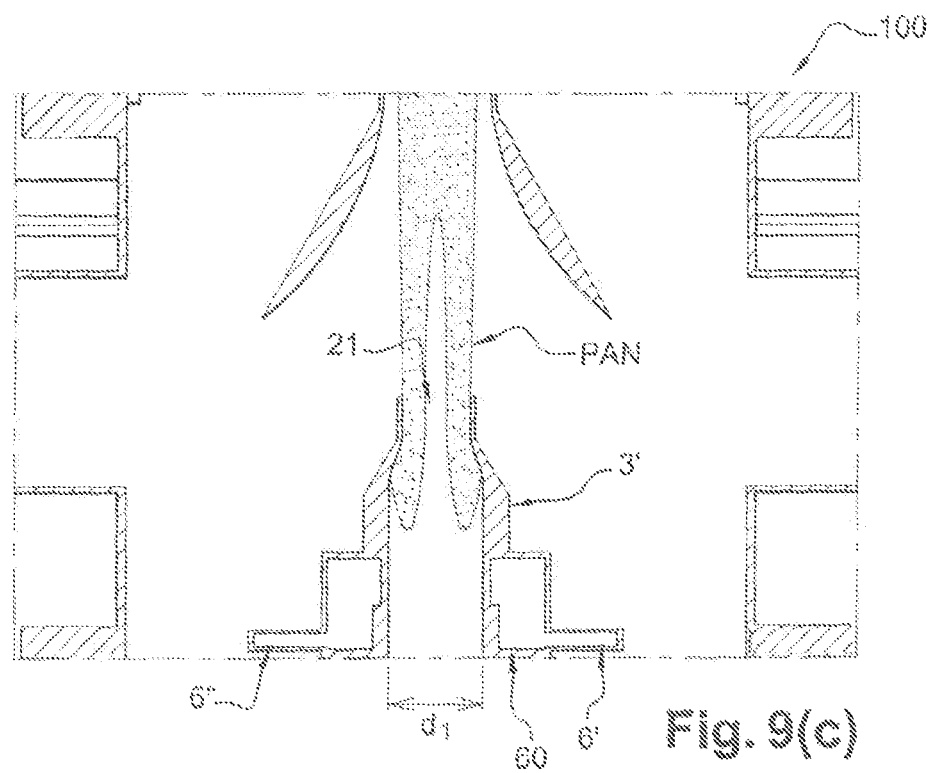
Figure 10:
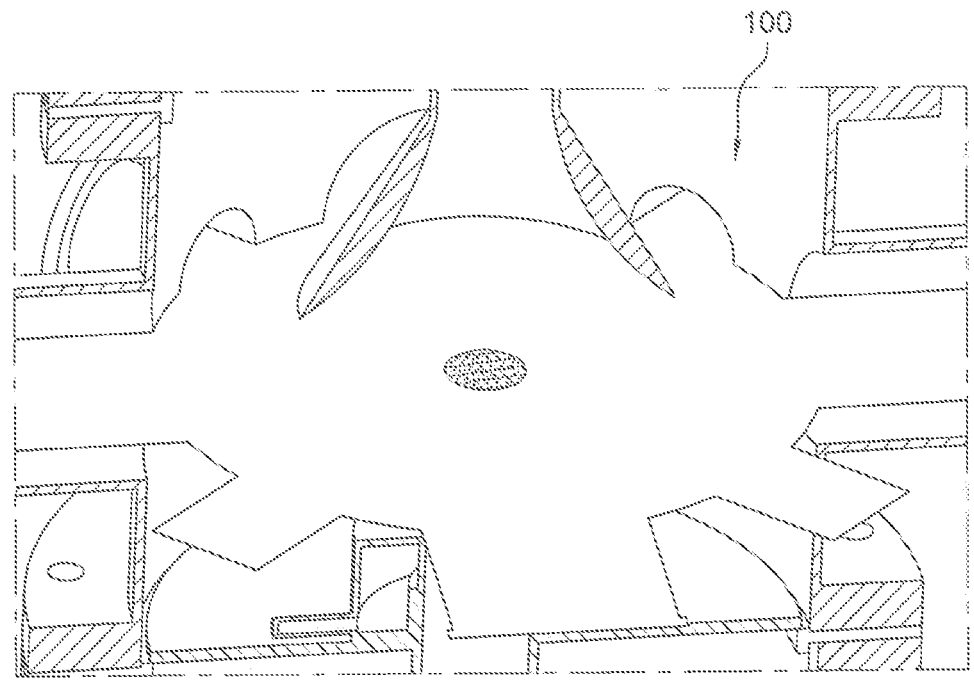
Figure 11:
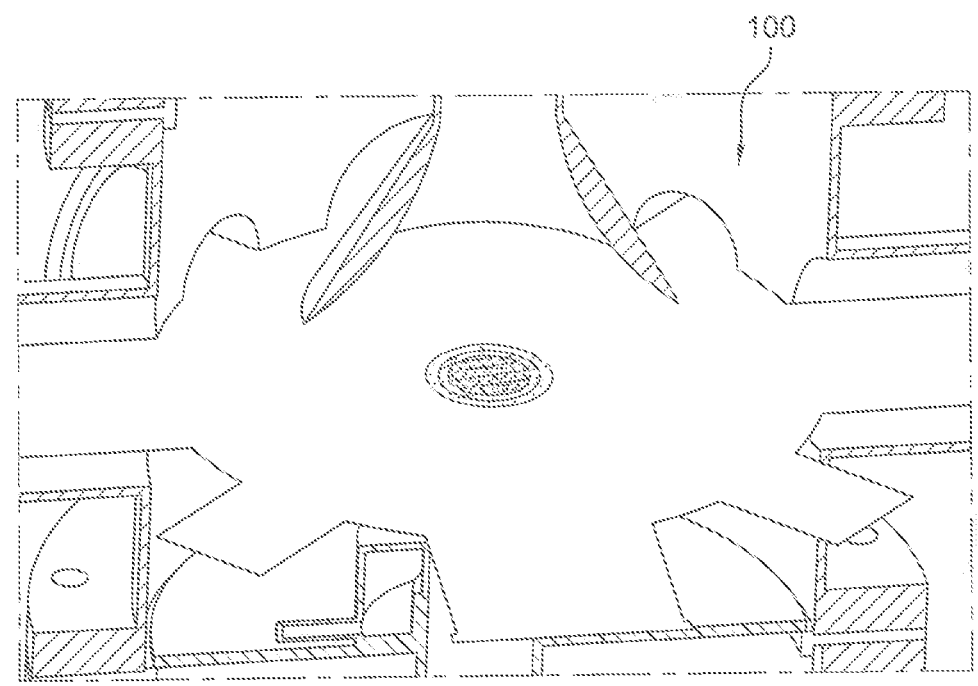
Figure 12A:
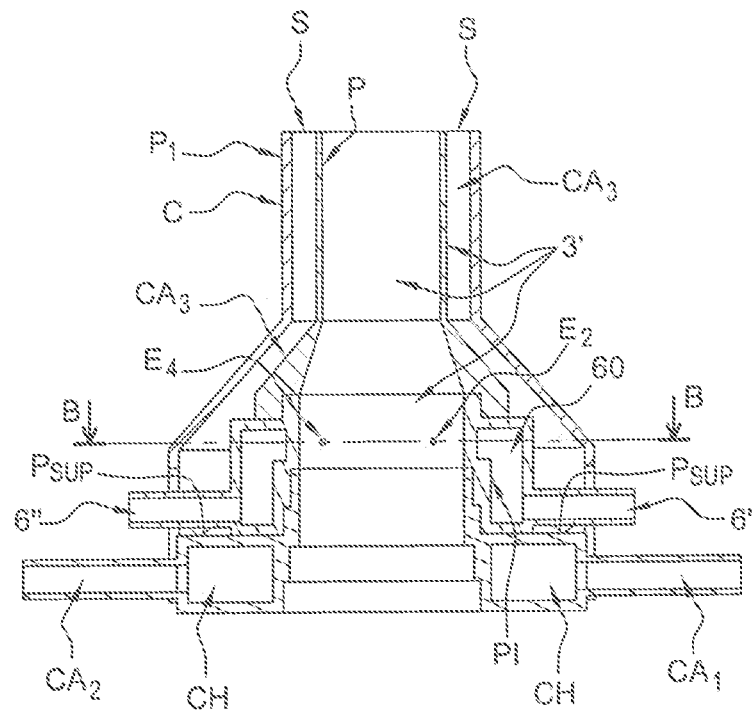
Figure 12B:
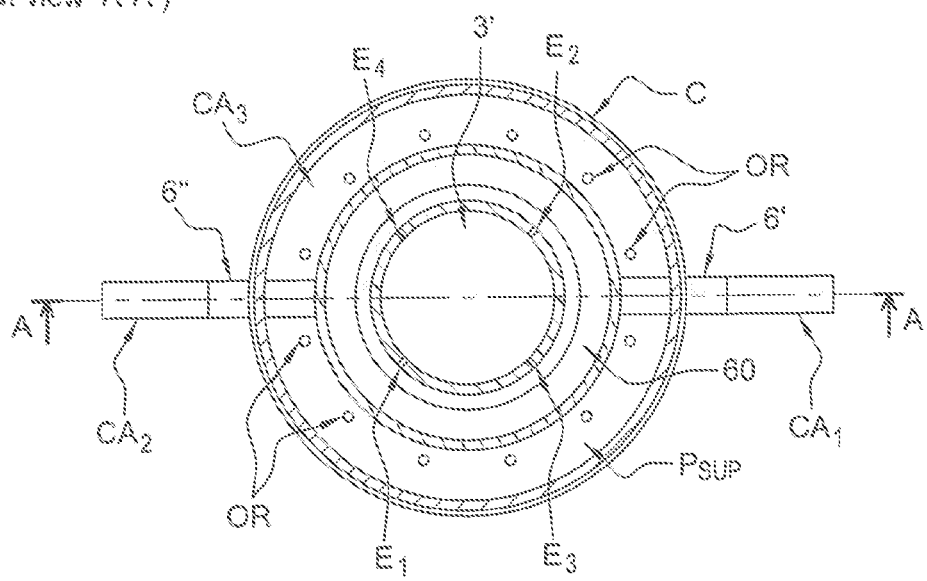
Figure 13A:
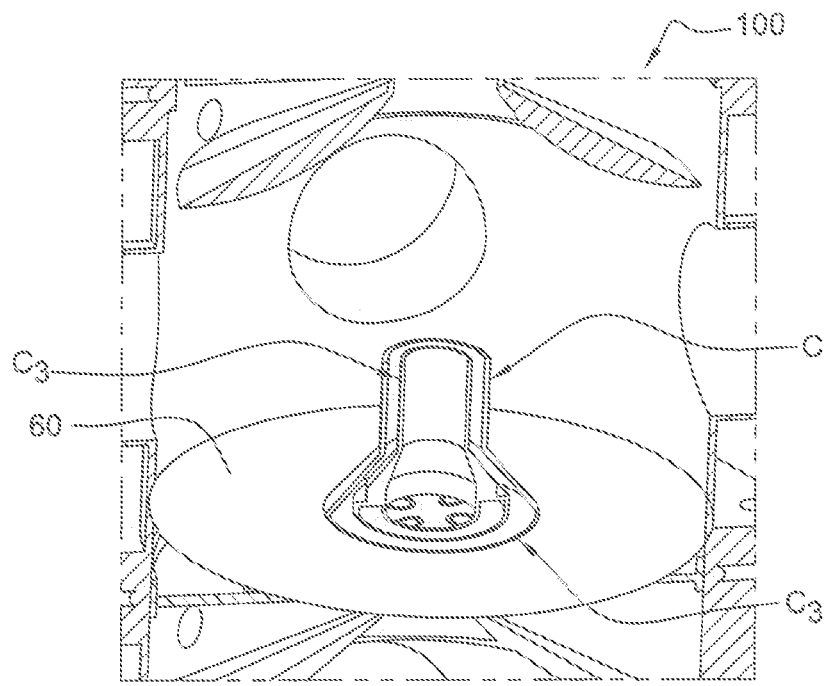
Figure 13B:
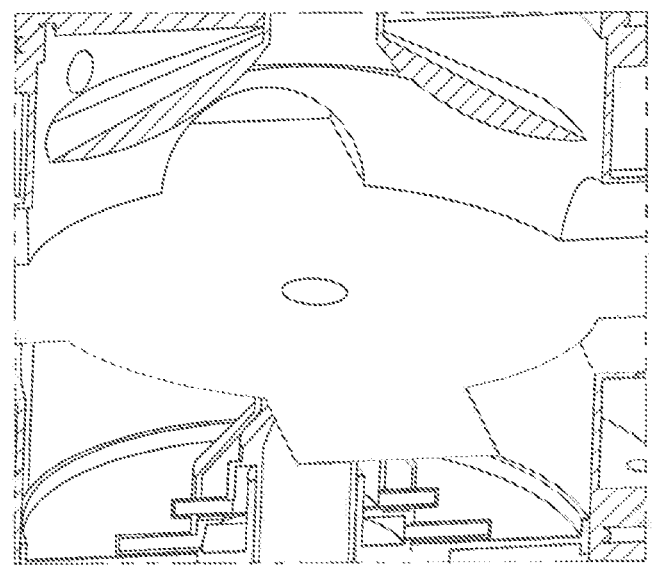
Figure 13C:
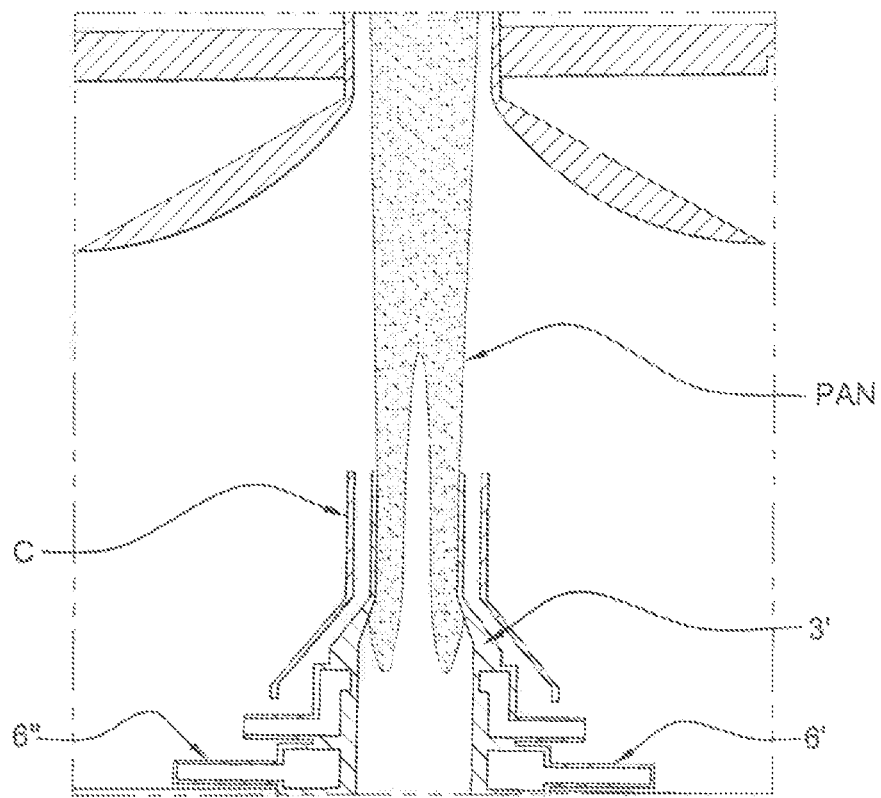

FIGS. 3(a) to 3(d) show several versions of a device according to the invention, each version differing from the others by the optical device used with the reactor shown in FIG. 1;

FIG. 4, which comprises FIGS. 4(a) and 4(b), is a magnified view of the reactor of FIG. 2 at the interface between an inlet duct for the precursors of the shell and a communication channel between the two chambers of the reactor, respectively along a first cross-section view and along a second cross-section view;

FIG. 5, which comprises FIGS. 5(a) and 5(b), is an embodiment version of FIG. 4, shown respectively along a first cross-section view and along a second cross-section view;

FIG. 6, which comprises FIGS. 6(a) and 6(b), is another embodiment version of FIG. 4, shown respectively along a first cross-section view and along a second cross-section view;

FIG. 7, which comprises FIGS. 7(a) and 7(b), is another embodiment version of FIG. 4, shown respectively along a first cross-section view and along a second cross-section view;

FIG. 8 provides the results of an analysis (Raman spectroscopy) of an experimental test conducted with the device according to the invention, in its configuration of FIG. 5;

FIG. 9, which comprises FIGS. 9(a) to 9(c), shows the results of a digital simulation obtained with the device according to the invention, in its configuration of FIG. 5;

FIG. 10 shows another digital simulation result obtained with the device according to the invention, in its configuration of FIG. 5;

FIG. 11 shows yet another digital simulation result obtained with the device according to the invention, in its configuration of FIG. 5;

FIG. 12, which comprises FIGS. 12(a) and 12(b), is an embodiment version of FIG. 5, shown respectively along a first cross-section view and along a second cross-section view;

FIG. 13, which comprises FIGS. 13(a) to 13(c), shows the results of a digital simulation obtained with the device according to the invention, in its configuration of FIG. 12.

DETAILED DESCRIPTION

In FIG. 2, the reactor 100 comprises a first chamber 1, a second chamber 2 and a communication channel 3' between the two chambers 1, 2. Advantageously, the communication channel 3' comprises a lower part 32', housed in the first chamber 1, which is in the form of a cone to improve the retrieval of the cores of the nanoparticles.

In the present case, the reactor 100 is arranged vertically, so that the second chamber 2 is located above the first chamber 1. Nonetheless, the reactor 100 shown in FIG. 2 could also be installed differently and in particular vertically so that the second chamber 2 is located below the first chamber 1.

The first chamber 1 is provided with an inlet 11 for a core precursor. The inlet 11 is generally in the form of an injection nozzle.

The second chamber 2 is also provided with an inlet 21. This inlet 21 is formed with the outlet of the communication channel 3' between the two chambers 1, 2 of the reactor 100.

The reactor 100 comprises at least one inlet channel 6' of the shell precursor leading to the second chamber 2.

More specifically, said at least one inlet channel 6' comprises one end connected to a source 14 for that precursor and another end, in the form of a chamber 60 called distribution chamber surrounding the communication channel 3' between the two chambers 1, 2.

The chamber 60 comprises, on its inner periphery PI, at least one opening and advantageously, as shown FIG. 2, at least two openings $E_1, E_2, \ldots, E_N$, with N a positive integer, opening inside the communication channel 3' between the two chambers 1, 2 of the reactor. These openings thus enable transfer of the shell precursors to the channel 3', the latter subsequently transporting them towards the inlet 21 of the second chamber 2 of the reactor 100. Advantageously, several openings are provided, as this configuration is conducive to a more homogeneous distribution of the precursor inside the channel 3'.

Several inlet channels for the shell precursor can be considered, FIG. 2 showing the case where only one inlet channel 6' is provided. It should be noted that if several inlet channels of the shell precursor are provided, the distribution chamber 60 can be shared by all of the inlet channels. And, if several inlet channels of the shell precursor are provided, a chamber for each inlet channel can also be provided.

This is explained in further detail in the description below, with reference to FIGS. 4 to 7.

The first chamber 1 is therefore used for the synthesis of the core and the second chamber 2 is used for the synthesis of the shell and the final formation of core-shell nanoparticles.

The combination of the shell precursor and of the core of the nanoparticles is thus performed inside the second chamber 2. Therefore, it should be understood that the distribution chamber 60 is located inside the second chamber 2. Furthermore, this combination occurs before the zone of interaction 7 with the laser beam 10, and therefore more specifically and in particular inside the channel 3', between the openings $E_1, E_2, \ldots, E_N$ and the inlet 21 of the second chamber 2.

The synthesis of the core and the shell therefore occurs in succession, both in time and in space. However, the production of nanoparticles is conducted in a continuous manner, by supplying each inlet 11 on one hand, and $E_1, E_2, \ldots, E_N$ on the other hand, with a continuous flow of a precursor dedicated, depending on the case, to the synthesis of the core or to the synthesis of the shell.

The inlet 11 of the first chamber 1 is connected to an inlet channel 4 of the core precursor, said channel 4 being connected to a source 9 for the core precursor.

A neutral gas is supplied to the first chamber 1 through a duct 12, a part of which surrounds the channel 4, said duct 12 being further connected to a source 13 of said gas.

The neutral gas is mainly used for the confinement of the interaction zone. This prevents contact between the precursor and the walls of the chamber, thereby limiting the risk of chemical reactions with the silicon precursors of the core and/or of the shell. The neutral gas also prevents the oxidising of the formed core by reaction with ambient air.

With this confinement, it is possible to further avoid, and even totally prevent, pollution of the core. The core thereby retains its chemical integrity, without the formation of oxides and other chemical compounds.

The laser beam 10 is emitted by an optical device 200, 201, 202, 203 comprising, for that purpose, a laser located outside the chambers 1, 2 of the reactor 100. This optical device is described in further detail below, with reference to FIGS. 3(a) to 3(d). As it passes through this first interaction zone 5, the core precursor forms the cores of the nanoparticles by pyrolysis.

The core thereby formed is then transported in the communication channel 3' between the two chambers 1, 2. The purpose of this communication channel 3' is to transmit the cores of the nanoparticles formed in the first chamber 1 towards the second chamber 2. For this purpose, it is advantageously provided with a conical lower part 32. Also for this purpose, the flow of neutral gas advantageously contributes to the transfer of the cores of the nanoparticles towards the second chamber 2.

In parallel to the transmission of the cores of the nanoparticles towards the second chamber 2, a shell precursor is brought to the second chamber 2.

The core of the nanoparticles and the shell precursor therefore combine in the second chamber 2, and more specifically in the communication channel 3' between the two chambers 1, 2 of the reactor 100. This combination must occur before a second zone of interaction 7 with the laser beam 10. For this purpose, the flow rate conditions for each precursor are controlled.

The precursor of the shell of the nanoparticles is therefore transported, along with the cores of the nanoparticles, to the zone of interaction 7 with the laser beam 10 to form the shell and the core-shell nanoparticles. This laser beam 10 is generated by the abovementioned optical device.

When the core-shell nanoparticles are formed, they are extracted from the reactor 100 through a nanoparticle retrieval channel 15, advantageously comprising collectors provided with filters.

The supply of precursors to each chamber 1, 2 is performed independently. In practice, this configuration enables producing any type of core-shell nanoparticle.

Furthermore, the device 300, 301, 302, 303 enables producing core-shell nanoparticles with a homogeneous distribution of the shell around the core.

Furthermore, the precursors can be in the form of a gas, a liquid or a solid.

By way of an example, it is possible to consider gaseous precursors of the silane, ethylene or diborane type.

It is possible to consider liquid precursors of the titanium isopropoxide type. It is also possible to consider adding acetylene, titanium tetrachloride, zirconium or aluminium butoxide, the acetones, acetylacetones, and nitrates of metals or rare earths, and more generally any of the organometallic precursors for the chemical vapour deposition, insofar as these are mixed by a sensitising agent, enabling them to absorb the laser radiation.

Finally, it is possible to consider solid powders, such as zinc nanopowder, advantageously carried by a neutral carrier gas.

The different optical devices likely to be used with the reactor 100 shown in FIG. 2 are now going to be described. The purpose of each optical device is to illuminate each of the two chambers and each optical device therefore comprises at least one laser.

Figure 3A:
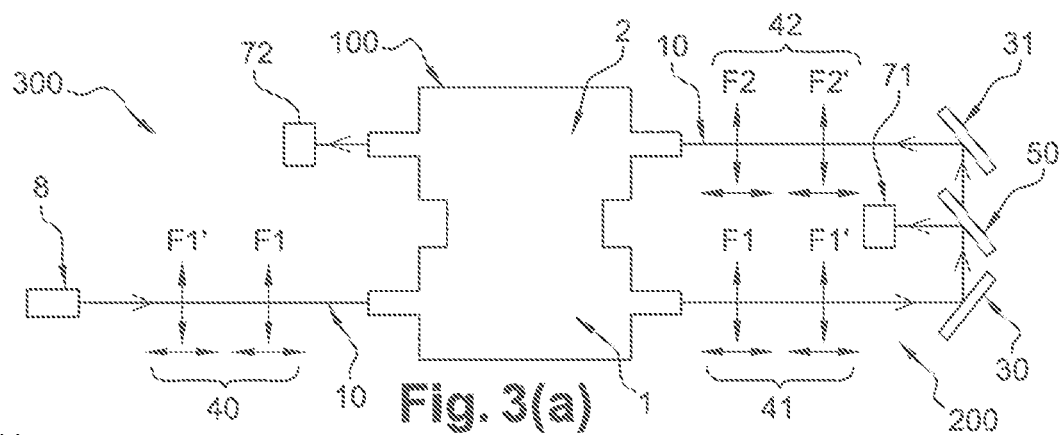
Figure 3B:
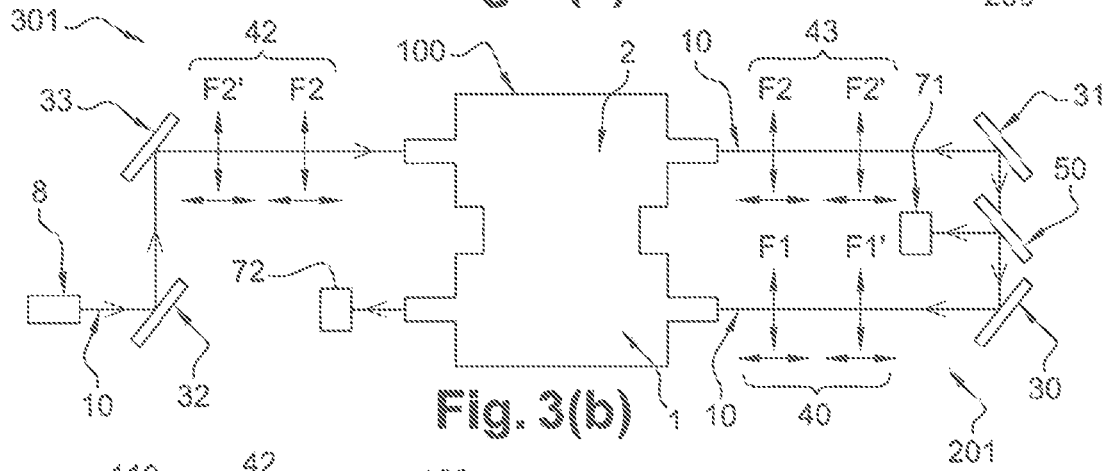
Figure 3C:
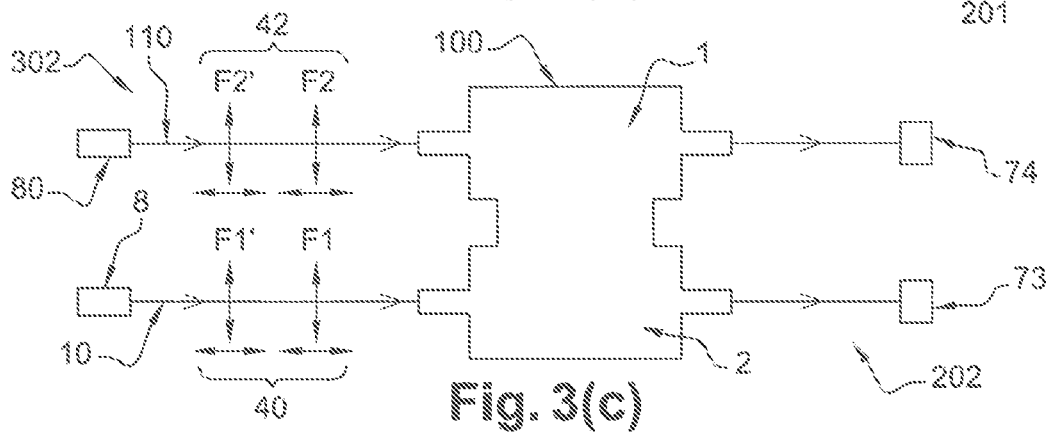
Figure 3D:
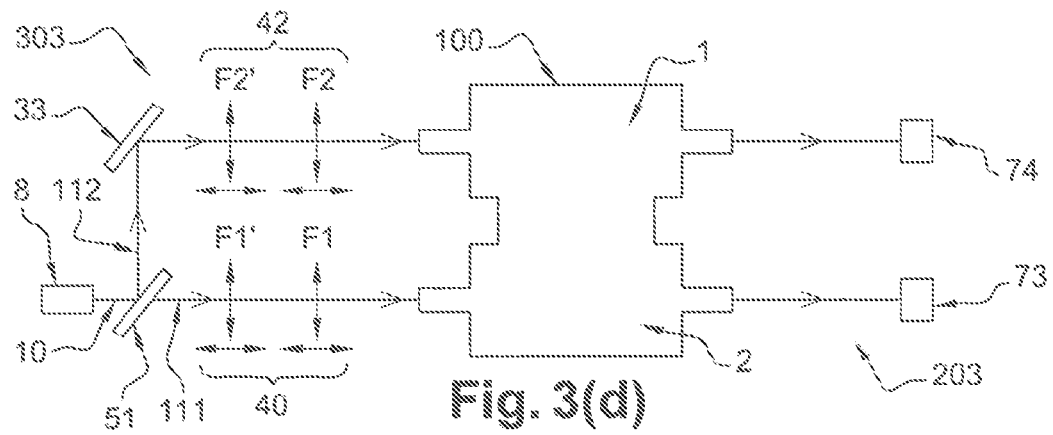

In FIG. 3(a), the optical device 200 comprises a laser 8 and a set of two mirrors 30, 31. The laser 8 is located on the side of the first chamber 1 to illuminate said first chamber first. The laser beam 10 has a propagation axis secant with the vertical axis, and in this case, horizontal. The first chamber 1 therefore comprises side walls 16, 17 that are transparent to the laser beam 10, thereby enabling a laser beam to traverse it completely, along a substantially horizontal axis.

It is possible to consider another arrangement of the laser 8 with respect to the reactor 100. However, this arrangement is particularly convenient as it ensures that the laser beam interacts with said precursors in order to form the core and the shell.

The set of mirrors 30, 31 redirects the laser beam 10 coming from the first chamber 1 towards the second chamber 2, so that the laser beam traverses the second chamber along an axis of propagation secant with the vertical axis and, in this case, horizontal. The second chamber 2 therefore comprises side walls 18, 19 that are transparent to the laser beam.

Advantageously, the mirrors 30, 31 are flat and associated with one or several focusing means 40, 41, 42. Therefore, and as shown in FIG. 3(a), it is possible to implement a first focusing means 40 between the laser 8 and the first chamber 1, a second focusing means 41 between the first chamber 1 and the mirror 30 (in order to re-collimate the laser beam 10 from the first chamber 1 before it is sent to the mirrors 30, 31), and finally a third focusing means 42 between the mirror 31 and the second chamber 2.

In another version, it is possible to remove the third focusing means 42 and keep only the two other focusing means 40, 41. In this case, only the laser beam 10 passing through the first chamber 1 is focused.

According to another version, it is also possible to retain only the third focusing means 42, without implementing the other two 40, 41. In this case, only the laser beam 10 passing through the second chamber 2 is focused.

Furthermore, these flat mirrors 30, 31 can be implemented alone, without focusing means.

A beam splitter 50 can be provided between the two chambers 1, 2 on the route of the laser beam 10, and advantageously between the two mirrors 30, 31. For example, it is possible to implement a beam splitter 50 made of ZnSe.

The introduction of a beam splitter 50 enables control of the power of the laser beam 10 traversing the second chamber 2, said power in this case being necessarily weaker than the power of the laser beam 10 traversing the first chamber 1.

This can be interesting depending on the chemical nature of the precursors injected in the chambers 1, 2. Indeed, certain precursors require less energy than others to be broken down. This can also be interesting in terms of controlling the structural properties of the core-shell nanoparticles ultimately expected. Indeed, they may require varying temperatures that can be controlled by means of the beam splitter 50.

Stopping means 71, 72 for the laser beam are provided, in particular at the outlet of the second chamber 2.

It should be noted that it possible to replace the flat mirrors 30, 31 with concave mirrors. Such mirrors not only enable redirecting the laser beam 10 from one chamber to the other like flat mirrors, but they also serve as means to focus the laser beam 10. With a concave mirror, a focusing means is therefore no longer required. For example, it is possible to replace the mirror 31 and the focusing means 42 with such a concave mirror.

In this case, the positioning of the concave mirrors is important to correctly define the focusing zones of the laser beam in each chamber 1, 2, said focusing zones defining zones of interaction 5, 7 with the precursors.

The version 201 of the optical device 200 presented with reference to FIG. 3(*a*) does therefore not provide a laser beam 10 power that is greater in the second chamber 2 than in the first chamber 1.

For this reason, and depending on the chemical nature of the precursors of the core and of the shell, it is possible to invert the assembly, i.e. to send the laser beam 10 from the laser 8, first through the second chamber 2, and then through the first chamber 1.

This possibility is shown in FIG. 3(*b*).

With reference to FIG. 3(*a*), the laser 8 has not moved with respect to the reactor 100. A set of mirrors 30, 31, 32, 33 is provided to send the laser beam 10 through the second chamber 2 and then through the first chamber 1.

Advantageously, the mirrors 30, 31, 32, 33 are flat mirrors associated with focusing means 41, 42, 44, some of which 41, 44 define interaction zones with the precursors in the chambers 1, 2.

Therefore, and as shown in FIG. 3(*b*), it is possible to implement a first focusing means 42 between the laser 8 and the second chamber 2, more specifically after the mirror 33, a second focusing means 43 between the second chamber 2 and the mirror 31 (in order to re-collimate the laser beam 10 from the second chamber 2 before it is sent to the mirrors 31, 30), and finally a third focusing means 40 between the mirror 30 and the first chamber 1.

In another version, it is possible to remove the third focusing means 40 and keep only the two other focusing means 40, 41. In this case, only the laser beam 10 passing through the second chamber 2 is focused.

According to another version, it is also possible to retain only the third focusing means 40, without implementing the other two 42, 43. In this case, only the laser beam 10 passing through the first chamber 1 is focused.

Furthermore, it is possible to remove the focusing means and to retain only the flat mirrors.

In another version, the flat mirrors 30, 31, 33 are replaced with concave mirrors that also serve as means to focus the laser beam.

Furthermore, a beam splitter 50 can be provided between the second chamber 2 and the first chamber 1, with reference to the direction of propagation of the laser beam 10, and advantageously between the two mirrors 30, 31. The beam splitter can for example be made of ZnSe. It is therefore possible to control the ratio of the power of the laser beam 10 traversing the first chamber 1 to the power of the laser beam traversing the second chamber 2.

Naturally, it is possible to arrange the laser 8 opposite the second chamber 2, which enables removal of the mirrors 32, 33.

Should the user wish to overcome a possible issue with the available power of the laser beam between the two chambers, it is also possible to implement an optical device 202 comprising two lasers 8, 80, each laser being dedicated to the illumination of one of the two chambers 1, 2 (laser beam 10 or laser beam 110, respectively).

This possibility is shown in FIG. 3(*c*).

Each laser 8, 80 is then arranged on the side of the reactor 100, opposite one of the two chambers. Each laser beam 10, 110 therefore traverses the adjacent associated chamber.

Advantageously, each laser 8, 80 is associated with a focusing means 40, 42, serving to define the abovementioned interaction zones 5, 7. In an alternative version, no focusing means are implemented, or only one of the two lasers 8, 80 is associated with such a focusing means.

Finally, it is also possible to implement an optical device 203 capable of illuminating the two chambers 1, 2 in parallel with a single laser 8. The laser 8 can then be positioned, with respect to the reactor 100, as is shown in FIG. 3(*a*) or 3(*b*). For this purpose, a beam splitter 51 is necessary to split the laser beam 10 from the laser 8 into two beams 111, 112. The beam splitter 51 can be made of ZnSe. It can, depending on the needs, be defined to transmit more power to one of the two chambers 1, 2 or to transmit the same amount of power to each chamber 1, 2. At least one mirror 33, preferably flat, is required in this case.

This last possibility is shown in FIG. 3(*d*).

It should be noted that this last possibility is particularly flexible to use. Indeed, it enables control of the power of the illumination injected in each chamber 1, 2 without being limited by a power ratio between the two chambers as in the versions shown in FIGS. 3(*a*) and 3(*b*). It avoids using two lasers as in the version shown in FIG. 3(*c*).

Advantageously, each laser beam 111, 112 is associated with a focusing means 40, 42, serving to define the abovementioned interaction zones 5, 7. In this case, the mirror 33 is a flat mirror.

In another version, only one of the two laser beams 111, 112 is associated with such a focusing means. In the case where only the laser beam 112 sent through the mirror 33 is focused, the mirror 33 is flat.

The flat mirror 33 and the focusing means 42 shown in FIG. 3(*d*) can be replaced with a concave mirror also serving the same focusing purpose as the focusing means 42.

According to another version, no focusing means is provided.

Regardless of the version considered for the optical device, the laser 8, 80 can be a laser of the $CO_2$ type emitting at a wavelength of 10.6 microns. Other types of lasers known to the person skilled in the field for the capacity to break down certain precursors can be considered.

Each focusing means 40, 41, 42, 43 can be formed by a spherical lens or by one or two cylindrical lens(es). In the FIGS. 3(*a*) to 3(*d*), each focusing means 40, 41, 42, 43 is made of two cylindrical lenses.

When a spherical lens is used, it is possible to vary the diameter of the focal spot defining the heart of the interaction zone by modifying the distance between the lens and the interaction zone. With a cylindrical lens, it is possible to vary the height of the focal spot by modifying the distance between the lens and the interaction zone. With two cylindrical lenses, it is possible to vary both the width and the height of the focal spot by modifying, on one hand the distance between the two lenses, and on the other hand the distance between the pair of lenses and the interaction zone.

It should be noted that modifying the distance between the focusing means (40, 42 in FIG. 3(*a*); 42, 40 in FIG. 3(*b*); 40 and/or 42 FIGS. 3(*c*) and 3(*d*)) of the laser beam 10 and the zone of interaction between this laser beam 10 and the precursors is, in practice, similar to modifying the distance between this focusing means and the adjacent chamber 1, 2 (in FIG. 3(*a*) for example, the focusing means 40 is adjacent to the first chamber 1 and the focusing means 42 is adjacent to the chamber 2), in which the interaction zone is located.

These various focusing means thus enable, by modifying the position of the lenses, to define, for a given laser, the incident power per unit area (radiant exposure) of the laser beam, and therefore of the temperature inside said zone.

This affords the device great adaptability, which is useful to synthesise different types of core-shell nanoparticles. The choice is based on the chemical nature of the precursors intended to form the core and the shell of the core-shell nanoparticles.

By way of an example, one considers a spherical lens with a focal length F'=750 mm, the position of which is adjustable by a distance ranging from 750 mm to 1060 mm with respect to the zone of interaction between the laser beam and the precursors.

In this example, the diameter of the focal spot is adjustable, depending on the position of the lens, between a minimum value close to 0.5 mm and a maximum value of several millimetres. The minimum diameter of the focal spot is reached when the distance between the lens and the zone of interaction between the laser and the precursors is equal to the focal length of the lens. Inversely, the maximum dimensions of the focal spot are reached when the distance between the lens and the point of interaction of the laser and the precursors is the greatest. In this manner, it is possible to vary the incident radiant exposure of the laser at the interaction point by maintaining constant incident power with the laser. The incident radiant exposure of the laser at the point of interaction can influence how efficiently the precursors break down.

By using two cylindrical lenses instead of a spherical lens, and by intersecting the focusing planes, it is possible to adjust separately, by acting on the distance of each lens to the interaction zone, the height and the width of the focal spot.

If the objective is to reduce to a minimum the dimensions of this focal spot, it is possible to consider implementing a beam expander (not shown) at the outlet of the laser 8, 80. Thus, with a $CO_2$ laser operating at a wavelength of 10.6 microns, a laser beam expanded to a diameter of 45 mm and a spherical lens with a focal length of 150 mm, a focal spot of approximately 170 microns is achievable.

The dimensions of the focal spot can also be adapted, in particular by changing the radiant exposure of the laser beam, with concave mirrors. For this purpose, the position of the concave mirror is adjusted with respect to the adjacent chamber of the reactor.

A more detailed description is now given of a part of the reactor, to which the precursors of the shell are transported by the communication channel 3' between the two chambers 1, 2 by said at least one opening $E_1, E_2, \ldots, E_N$.

Various embodiments are possible, and among these, four are more specifically shown in FIGS. 4 to 7.

In these FIGS. 4 to 7, it was decided to provide two inlet channels 6', 6" of the shell precursor, each end of which is in the form of a shared distribution chamber 60. In practice, each inlet channel can be connected to the source 14.

As explained previously, it is possible to provide only a single inlet channel 6' (see FIG. 2). It is also possible to provide more than two inlet channels. However, providing two inlet channels 6', 6" is advantageous in that it provides a good balance between the possibility of bringing the precursor rapidly to the distribution chamber 60, homogeneously, and the complexity of the reactor 100. For these two inlet channels, the choice of a shared chamber is only interesting in that it facilitates the design of the reactor 100.

Thus, in all cases, an inlet channel 6', 6" of a shell precursor has an end in the form of a distribution chamber 60, surrounding the communication channel 3' between the two chambers 1, 2. This distribution chamber 60 has at least one opening connecting the chamber 60 to the communication channel 3' between the two chambers 1, 2.

FIG. 4 shows a first possibility, wherein two openings $E_1$, $E_2$ are provided between the distribution chamber 60 and the communication channel 3' between the two chambers 1, 2 of the reactor 100.

FIG. 5 shows another possibility, wherein four openings $E_1$, $E_2$, $E_3$ and $E_4$ are provided between the distribution chamber 60 and the communication channel 3' between the two chambers 1, 2 of the reactor 100.

FIG. 6 shows another possibility, wherein eight openings $E_1, E_2, E_3, E_4, E_5, E_6, E_7$ and $E_8$ are provided between the distribution chamber 60 and the communication channel 3' between the two chambers 1, 2 of the reactor 100.

Finally, FIG. 7 shows yet another possibility, $E_1$, wherein sixteen openings $E_1, E_2, E_3, E_4, E_5, E_6, E_7, E_8, E_9, E_{10}, E_{11}, E_{12}, E_{13}, E_{14}, E_{15}$ and $E_{16}$ are provided between the distribution chamber 60 and the communication channel 3' between the two chambers 1, 2 of the reactor 100.

As can be seen in FIGS. 4 to 7, the number of openings $E_1, \ldots, E_N$ advantageously ranges from 2 to 16. The presence of at least two openings between the distribution chamber 60 and the communication channel 3' between the two chambers 1, 2 of the reactor is indeed advantageous in that it ensures an adequate distribution of the precursor inside the channel 3'. Furthermore, although it is possible to envisage 16 openings, increasing the number of openings beyond this quantity features little effect in terms of controlling the adequate distribution of the precursor inside the channel 3'.

The shape of each opening $E_1, \ldots, E_N$ is of little importance, but generally a circular shape is provided, as shown in FIGS. 4 to 7. Each opening $E_1, \ldots, E_N$ can have a greater dimension (which is the diameter in the case of a circular opening) ranging from 0.1 mm to 5 mm, preferably from 0.5 mm to 3 mm.

As is shown in FIGS. 4 to 7, the openings are advantageously distributed evenly around the inner periphery PI of the distribution chamber 60. The term "distributed evenly" is used to describe the fact that the openings are distributed at regular angular intervals between two successive openings on the inner periphery PI of the distribution chamber 60. For example, in the specific case of FIG. 4 (two openings), this even distribution implies that the openings $E_1$, $E_2$ are diametrically opposite one another on the inner periphery PI of the distribution chamber 60, which in this case features an annular shape. This enables better control of the distribution of the precursor inside the communication channel 3' between the two chambers 1, 2 of the reactor 100.

Also advantageously, when several openings $E_1, \ldots, E_N$ are provided, they are identical. This too enables better homogenisation of the distribution of the shell precursor inside the communication channel 3' between the two chambers 1, 2 of the reactor 100.

Embodiment Example (Experimental Test):
Synthesis of Nanoparticles with a Core of Silicon and a Shell of Carbon The optical device 200 used is that of FIG. 3(c), without focusing means 40, 42.

The reactor 100 is that shown in FIG. 2, with the subassembly of FIG. 5. Silane is used as core precursor (silicon). Ethylene is used as shell precursor (carbon).

In FIG. 5, the presence of four openings, $E_1$ to $E_4$, should be noted. Each opening $E_1$ to $E_4$, in this case circular, has a diameter of 1 mm.

The following parameters are used:
silane flow rate (chamber 1)=50 sccm;
ethylene flow rate (chamber 2)=500 sccm, 600 sccm and 700 sccm (this is a total flow rate arriving in the chamber 60, in this case through the inlet channels 6', 6");
power of the laser 8 (chamber 1)=1000 W;
power of the laser 80 (chamber 2)=1300 W;
pressure inside the reactor=atmospheric;
inlet diameter (d) 11=2 mm;
diameter ($d_1$) of the communication channel 3' between the two chambers, $d_1$=3.33 cm.

Nanoparticles (core+shell) with a diameter of approximately 15 to 20 nm were thereby obtained.

FIG. 8 is a Raman spectroscopy with, on the X axis, the wavelength (cm$^{-1}$) and on the Y axis the intensity of the signal (arbitrary unit). This measurement by Raman spectroscopy is a local measurement.

Three curves are provided namely curves C1, C2 and C3. The curve C1 corresponds to the flow rate of 500 sccm of ethylene (precursor of the carbon shell). The curve C2 corresponds to the flow rate of 600 sccm of ethylene. The curve C3 corresponds to the flow rate of 700 sccm of ethylene. All the provided measurements relate to a given quantity of silicon, which remains the same for the different curves.

In this FIG. 8, and for each curve C1 to C3, the presence of a first peak is noted, in the wavelength range of 500-520 cm$^{-1}$, which corresponds to the presence of silicon (core). For each curve C1 to C3, the presence of a second "peak" is also noted, in the wavelength range of 1200-1600 cm$^{-1}$, which corresponds to the presence of carbon (shell). It should also be noted that the greater the flow rate of ethylene, the greater the intensity of the Raman signal, which shows that more carbon is being produced, on coreshell nanoparticles, for a given quantity of silicon.

Additionally, global measurements can be provided.

Thus, it should be noted that for the curve C2 (600 sccm of ethylene), the percentage by weight of carbon, in the powders retrieved at the outlet of the reactor, is 6.7%. For the curve C3, the percentage by weight of the carbon is 6.8%.

This demonstrates the efficacy of the dissociation of the ethylene and the incorporation of the carbon (shell) around the silicon core.

Digital Simulation Example (Example 1)

The reactor 100 is that shown in FIG. 2, with the subassembly of FIG. 5. Silane is used as core precursor (silicon). Ethylene is used as shell precursor (carbon).

In FIG. 5, the presence of four openings, $E_1$ to $E_4$, should be noted. Each opening $E_1$ to $E_4$, in this case circular, has a diameter of 1 mm.

The following parameters were used:
silane flow rate (chamber 1)=100 sccm;
ethylene flow rate (chamber 2)=400 sccm;
pressure inside the reactor=atmospheric;
inlet 11 diameter (d)=2 mm;
diameter ($d_1$) of the communication channel 3' between the two chambers, $d_1$=3.33 cm.

No specific data relating to the optical device was necessary to conduct this digital simulation, the purpose being to understand how the ethylene is distributed inside the communication channel 3' between two chambers 1, 2 after having passed through the openings separating the distribution chamber 60 from the channel 3'.

The calculation code used is the commercial code FloEFD version 15.

The results are shown in FIG. 9, which relies on several views to represent the evolution of the volume fraction of ethylene (precursor of the carbon shell) inside the communication channel 3' between the two chambers 1, 2 of the reactor 100.

More specifically, in FIG. 9(a), the presence of an ethylene plume PAN should be noted, inside the channel 3', and at the outlet of each of the four openings $E_1$ to $E_4$.

In FIG. 9(b), the same plume PAN is observed, but in a plane featuring a cross-section perpendicular to the AX axis of the reactor, taken at the assumed zone of interaction 7 with the laser beam 10 which can be emitted by the laser 80. At this level, it is noted that the ethylene is distributed in the form of a relatively homogeneous disc, in any case substantially more homogeneous than with the device according to document D1 (FIG. 4 of said document).

This is particularly advantageous in terms of increasing the conversion yield of the ethylene, in this interaction zone 7, in shells for the cores coming from the first chamber 1.

Although this aspect is not shown, similar results were obtained by digital simulation under the same conditions, with:
two openings, as proposed in FIG. 4 (example 2),
eight openings, as proposed in FIG. 6 (example 3), and
sixteen openings, as proposed in FIG. 7 (example 4).

In all cases, these digital simulations show a more homogeneous distribution of the ethylene at the zone of interaction 7 with the laser beam compared with the prior art disclosed in document D1 (FIG. 4 of said document). The distribution of the ethylene is similar to a disc. In other words, the carbon precursor combines with the silicon nanoparticles better than according to the prior art, and this more homogeneous combination is conducive to producing core-shell nanoparticles.

However, it was observed that the greater the number of openings, the greater the degradation of the homogeneity of the distribution at the zone of interaction 7 with the laser beam, although it remained acceptable in the range from two to sixteen orifices. Thus, with sixteen openings, all other simulation conditions being identical (in particular the diameter of an opening and the flow of ethylene transported to the distribution chamber 60), the distribution of the ethylene at the zone 7 of interaction with the laser beam changes, compared with the case where four openings are considered, and adopts a shape that is more annular than that of a disc.

According to the inventors, this is due to the fact that, for a given opening diameter and a given flow rate, the average speed of the precursor (ethylene in this case) in a given opening decreases as the number of openings increases, and inversely.

Other digital simulations have been conducted, confirming the influence of the speed of the precursor in an opening.

Thus, a digital simulation (example 5) was conducted under the same conditions as in example 1, but with twice the flow rate of ethylene, i.e. an ethylene flow rate (chamber 2) of 800 sccm (cm³/mn under standard conditions). Therefore, the average speed in a given opening is doubled.

The results of this digital simulation (example 5) are shown in FIG. 10.

It is observed that the ethylene features, at the zone 7 of interaction with the laser, a highly homogeneous disc shape, even more homogeneous than in FIG. 9(b).

Furthermore, another digital simulation (example 6) was conducted under the same conditions as in example 1, but with four times the flow rate of ethylene, i.e. an ethylene flow rate (chamber 2) of 1600 sccm. It should be noted that compared with the conditions of the example 5, this is similar to doubling the flow rate of ethylene.

The results of this digital simulation (example 6) are shown in FIG. 11.

It is observed that the ethylene has, at the zone 7 of interaction with the laser, a homogeneous disc shape, but with a greater concentration towards the centre.

In other words, by comparing the FIGS. 11, 10 and 9(b), the increase of the flow rate, and consequently of the speed in a given opening, translates into a greater ethylene concentration at the centre of the disc.

Yet another digital simulation (example 7) was conducted under the same conditions as in example 3, but with four times the flow rate of ethylene. It was thus observed that the distribution of the ethylene at the zone 7 of interaction with the laser was identical to that of FIG. 10, with respect to example 5. This is a very consistent result because, from example 5 to example 7, the number of openings was doubled, but so was the flow rate, which implies that the average speed in a given opening remains identical.

Finally, it should be noted that, in a final digital simulation (example 8), the same conditions as in example 1 were used, with the exception of the diameter d of an opening, which was doubled and therefore increased to d=2 mm. All things being equal, doubling the diameter further corresponds to reducing fourfold the average speed in a given opening. The result of this digital simulation therefore revealed, at the zone 7 of interaction with the laser, a distribution similar to that obtained in example 4, i.e. a disc-shaped distribution, but with a slightly higher concentration and tending towards an annular shape.

All of the above confirms that, to implement a method according to the invention, it is important to take into account the average speed of the precursors (in this case the ethylene) in a given opening separating the distribution chamber 60 from the communication channel 3' between the two chambers 1, 2 of the reactor 100.

Considering the particularly ideal situation of FIG. 10, the average speed of the precursor for a given opening is approximately 4.3 m/s.

In view of the different simulations that were conducted, the inventors consider that the average speed in a given opening should range from 0.5 m/s to 20 m/s. At the lower speeds, the disc representing the shape of the ethylene at the zone of interaction with the laser is slightly more concentrated in an annular shape, and at higher speeds, this disc is slightly more centred. However, the speed should not be excessively increased, to avoid recirculation phenomenae in the channel 3'.

Advantageously, this average speed of the precursor through a given opening ranges from 2 m/s to 15 m/s, more advantageously from 2 m/s to 12 m/s and even more advantageously from 3 m/s to 6 m/s.

It should be understood that this range of values depends on the number of openings, on the passage surface of the or of each opening (the diameter of the or of each opening for circular openings) and on the flow rate generated by the source 14. In practice, a design is chosen for the distribution chamber 60, i.e. the shape and the passage section of an opening, and the flow rate provided by the source is adjusted to obtain the abovementioned range of speed values. Thus, the invention also relates to a method for synthesising core-shell nanoparticles by laser pyrolysis, comprising the following steps (a) injecting a core precursor into the first chamber of a reactor;

(b) illuminating the core precursor with a laser beam in order to form, by pyrolysis, the core of the nanoparticles;

(c) transporting the core of the nanoparticles thus formed in step (b) into a second reactor chamber communicating with the first chamber by means of a communication channel between the two chambers;

(d) injecting a shell precursor in the second chamber of the reactor;

(e) illuminating the shell precursor with a laser beam in order to form, by pyrolysis, the shell of the nanoparticles and to ensure the deposition of the shell around the core;

characterised in that step (d) is performed by means of a distribution chamber (60) surrounding said communication channel (3') between the two chambers (1, 2), said distribution chamber (60) further being provided, on its inner periphery (PI), with at least one opening ($E_1, \ldots, E_N$) leading inside said communication channel (3'), so that the average speed of the precursor in said at least one opening ranges from 0.5 m/s to 20 m/s, preferably from 2 m/s to 15 m/s, and more preferably from 2 m/s to 12 m/s. More advantageously still, this speed ranges from 3 m/s to 6 m/s.

When one or several openings are provided, the average speed of the precursor through each opening ranges from 0.5 m/s to 20 m/s, preferably from 2 m/s to 15 m/s and even more preferably from 2 m/s to 12 m/s. Again and even more advantageously, the speed can range, for each opening, from 3 m/s to 6 m/s.

Another embodiment is shown in FIG. 12, which includes FIGS. 12(a) and 12(b).

FIG. 12(a) is a first cross-section view of a sub-assembly of the device, and FIG. 12(b) is a second cross-section view.

It is also possible to compare FIG. 12(a) with FIG. 5(a) and FIG. 12(b) with FIG. 5(b). Indeed, FIGS. 12 and 5 show in particular the distribution chamber 60, the channel 3' and the four orifices $E_1$, $E_2$, $E_3$, $E_4$ connecting the distribution chamber 60 to the channel 3'.

The main difference between the configuration of FIG. 12 and that of FIG. 5 resides in the presence of a chimney C surrounding the communication channel 3' between the two chambers 1, 2 of the reactor. It should be understood that this chimney is located in the second chamber 2 of the reactor.

This chimney C defines a channel $CA_3$ between the wall P1 of the chimney C and the wall P of the communication channel 3' between the two chambers 1, 2 of the reactor. The chimney C is intended to circulate a neutral gas that is sent to the channel $CA_3$ through two dedicated channels $CA_1$, $CA_2$. It should be noted that a single inlet channel can be considered.

Advantageously, as shown in FIG. 12, a distribution chamber CH is provided between the or each inlet channel $CA_1$, $CA_2$ and the channel $CA_3$ surrounding the communication channel 3 between two chambers 1, 2 of the reactor. This distribution chamber CH then surrounds the communication channel 3', as does the shell precursor distribution chamber 60. When this distribution chamber CH is implemented, orifices OR should be provided to transport the neutral gas from this distribution chamber CH towards the channel $CA_3$. This distribution chamber CH enables better distribution of the neutral gas in the channel $CA_3$. The number of orifices OR can vary. In FIG. 12, twelve orifices of the same type have been provided. In order to optimally distribute the flow of neutral gas, it is also useful to provide an even distribution of these orifices OR around the circumference of the wall $P_{SUP}$ of the distribution chamber CH that comes into contact with the channel $CA_3$, as is shown in FIG. 12(b).

The main interest of this embodiment version resides in that the neutral gas will confine, at the outlet of the communication channel 3' between the two chambers 1, 2 of the reactor, the core particles as well as the shell precursors. This is conducive to the production of core-shell particles.

FIG. 12 shows the case where four orifices $E_1$, $E_2$, $E_3$ and $E_4$ are provided. Naturally, a chimney C and, as necessary, a distribution chamber CH, can be provided for other configurations, in particular that of FIG. 4, 6 or 7.

Embodiment Example (Additional Experimental Test)

The configuration of FIG. 12 was tested under the same conditions as the experimental test described above, for ethylene flow rates of 600 sccm, 700 sccm and 800 sccm (this is always the total flow rate arriving in the chamber 60, in this specific case through the two inlet channels 6', 6").

The flow rate of neutral gas, in this case argon, was fixed at 3000 sccm (this is the total flow rate arriving in the distribution chamber CH). This flow rate is sufficient to achieve a confinement effect of the components exiting the communication channel 3' between the two chambers 1, 2 of the reactor 100.

Each orifice OR has a circular section, defined by a diameter of 2 mm.

Furthermore, the section S of the channel $CA_3$, at its outlet, is 500 mm².

Under these conditions, it was revealed that the percentage by weight of carbon in the powders retrieved at the outlet of the reactor and obtained with an ethylene flow rate of 600 sccm, was of 13.8% (global measurement). This value should be compared with that obtained under the same conditions, but without a chimney (FIG. 5), which is of 6.7%.

Furthermore, still under the same conditions, it was revealed that the percentage by weight of carbon obtained with an ethylene flow rate of 700 sccm was 13.9% (global measurement). This value should be compared with that obtained under the same conditions, but without a chimney (FIG. 5), which is 6.8%.

Finally, it should be noted that with the presence of the chimney C, it was possible to further increase the ethylene flow rate to 800 sccm, which was not possible in the absence of a chimney (indeed, at this flow rate and in the absence of a chimney, the powders recirculate in the second chamber 2 of the reactor, and the energy of the laser is absorbed by all of these powders). With this flow rate and for the chimney, the percentage by weight of carbon was greatly increased, to a value of 18.8%.

The confinement achieved by the neutral gas coming from the channel $CA_3$ is therefore particularly efficient in terms of increasing the carbon production on the core-shell nanoparticles, for a given quantity of silicon.

And if the quantity of silicon is also increased, the production of SiOC nanoparticles can also be increased.

Digital Simulation Example

The configuration of FIG. 12 was tested under the conditions of the example 1 (geometric aspect of the distribution chamber and associated orifices and flow rates implemented).

Each orifice OR has a circular section, defined by a diameter of 2 mm. Furthermore, the section S of the channel $CA_3$, at its outlet, is 500 mm². In other words, the geometric parameters associated with the presence of the chimney C are the same as in the experimental test conducted.

The flow rate of neutral gas, in this case argon, was fixed at 5000 sccm (this is the total flow rate arriving in the distribution chamber CH).

The results of this digital simulation are shown in FIG. 13, which relies on several views to represent the evolution of the volume fraction of ethylene (precursor of the carbon shell) inside the communication channel 3' between the two chambers 1, 2 of the reactor 100.

More specifically, in FIG. 13(a), the presence of an ethylene plume PAN should be noted, inside the channel 3', and at the outlet of each of the four openings $E_1$ to $E_4$.

This plume PAN is identical to that of FIG. 9(a).

In FIG. 13(b), the same plume PAN is observed, but in a plane featuring a cross-section perpendicular to the AX axis of the reactor, taken at the assumed zone of interaction 7 with the laser beam 10 likely to be emitted by the laser 80. At this level, it is noted that the ethylene is distributed in the form of a highly homogeneous disc, in any case substantially more homogeneous than that of FIG. 9(b).

It is therefore possible to observe, in FIG. 9(b), the effect of the confinement by the flow of argon exiting the chimney C (not shown in FIG. 13, as it only shows the volume fraction of ethylene) of the plume of ethylene.

The same confinement is also visible by comparing FIG. 13(c) with FIG. 9(c). Indeed, in FIG. 13(c), it is possible to observe that the plumes exiting the four orifices $E_1$, $E_2$, $E_3$ and $E_4$ join more rapidly than in FIG. 9(c).

The invention claimed is:

1. A device for synthesising core-shell nanoparticles by laser pyrolysis, the device comprising:
a reactor comprising:
a first chamber for the synthesis of the core, the first chamber being provided with an inlet for a core precursor;
a second chamber for the synthesis of the shell, the second chamber being provided with an inlet for a shell precursor; and
at least one communication channel between the two chambers to transmit the cores of the nanoparticles intended to be formed from the first chamber towards the second chamber;
an optical device to illuminate each of the two chambers, the optical device comprising at least one laser capable of emitting a laser beam intended to interact with said precursors to form the core and the shell;
wherein the device comprises at least a first shell precursor inlet channel, one end of which is in the form of a distribution chamber surrounding the communication channel between the two chambers of the reactor, said distribution chamber being further provided, on its inner periphery, with at least one opening leading inside said communication channel.

2. The device according to claim 1, wherein said distribution chamber comprises, on its inner periphery, at least two openings that lead inside said communication channel between the two chambers of the reactor.

3. The device according to claim 1, wherein said distribution chamber comprises, on its inner periphery, between two and sixteen openings that lead inside said communication channel between the two chambers of the reactor.

4. The device according to claim 2, wherein the openings of the distribution chamber are evenly distributed around the inner periphery of said distribution chamber.

5. The device according to claim 2, wherein the openings of the distribution chamber are identical.

6. The device according to claim 1, wherein each opening of the distribution chamber has a greater dimension ranging from 0.1 mm to 5 mm.

7. The device according to claim 1, wherein the optical device comprises a plurality of mirrors arranged so that the laser beam is capable of illuminating in succession the two chambers of the reactor.

8. The device according to claim 7, wherein the optical device comprises at least one beam splitter to adjust the power of the laser beam in each of the two chambers of the reactor, said beam splitter being located between two mirrors.

9. The device according to claim 1, wherein the optical device comprises a beam splitter and at least one mirror arranged so that the laser beam emitted by the laser is divided into two beams, each capable of illuminating one of the two chambers of the reactor.

10. The device according to claim 1, wherein the optical device comprises a first laser to illuminate the first chamber of the reactor and a second laser to illuminate the second chamber of the reactor.

11. The device according to claim 1, wherein the optical device comprises at least one focusing means arranged between each laser and at least one of the two chambers of the reactor.

12. The device according to claim 11, wherein the distance between said at least one focusing means and the adjacent chamber of the reactor is adjustable.

13. The device according to claim 10, wherein the focusing means comprises two cylindrical lenses, the distance between the two cylindrical lenses being adjustable.

14. The device according to claim 1, wherein the distribution chamber is located in the second chamber.

15. The device according to claim 1, further comprising at least one outlet channel for a neutral gas leading to an additional channel formed, at the level of the second chamber of the reactor, between the communication channel between the two chambers of the reactor and a chimney surrounding said communication channel between the two chambers of the reactor.

16. The device according to claim 15, further comprising, between said at least one inlet channel for the neutral gas and said additional channel, a distribution chamber of said gas located at the level of the second chamber of the reactor around the communication channel between the two chambers of the reactor, the distribution chamber comprising at least one orifice arranged to authorise the passage of the neutral gas towards said additional channel.

17. A method for synthesising core-shell nanoparticles by laser pyrolysis, the method comprising:
(a) injecting a core precursor into the first chamber of a reactor;
(b) illuminating the core precursor with a laser beam in order to form, by pyrolysis, the core of the nanoparticles;
(c) transporting the core of the nanoparticles thus formed in step (b) into a second reactor chamber communicating with the first chamber by means of a communication channel between the two chambers;
(d) injecting a shell precursor in the second chamber of the reactor; and
(e) illuminating the shell precursor with a laser beam in order to form, by pyrolysis, the shell of the nanoparticles and to ensure the deposition of the shell around the core;
wherein step (d) is performed by means of a distribution chamber surrounding said communication channel between the two chambers, said distribution chamber further being provided, on its inner periphery, with at least one opening leading inside said communication channel, so that the average speed of the precursor in said at least one opening ranges from 0.5 m/s to 20 m/s.

18. The method according to claim 17, wherein said distribution chamber comprises, on its inner periphery, at least two openings that lead inside said communication channel between the two chambers of the reactor.

19. The method according to claim 18, wherein the openings of the distribution chamber are evenly distributed around the inner periphery of said distribution chamber.

20. The method according to claim 18, wherein the openings of the distribution chamber are identical.

21. The method according to claim 18, wherein the average speed of the precursor in each opening ranges from 0.5 m/s to 20 m/s.

* * * * *